Patented Mar. 15, 1938

2,111,151

UNITED STATES PATENT OFFICE 2,111,151

GOLD, SILVER, AND BISMUTH ALICYCLIC MERCAPTO-COMPOUNDS

Eugen Mueller, Ludwigshafen-on-the-Rhine, Germany, assignor to Winthrop Chemical Company, Inc., New York, N. Y., a corporation of New York No Drawing. Application October 17, 1936, Serial No. 106,196. In Germany October 31, 1935

8 Claims. (Cl. 260—11)

The present invention relates to gold, silver and bismuth alicyclic mercapto compounds.

It is already known that many metal salts, inter alia also gold salts, react with acyclic, aromatic and heterocyclic mercaptans with the formation of the corresponding metal mercapto compounds.

I have now found that gold, silver or bismuth salts having high thereapeutic value are obtained by causing salts of the said metals to act on mercaptans in which an alicyclic ring is the carrier of the sulphydryl group. In addition to one or more sulphydryl groups, the said alicyclic mercaptans may contain other substituents, as for example alkyl groups or water-solubilizing groups such as carboxylic or sulphonic acid groups.

The preparation of the metal mercapto compounds may be effected by causing gold, silver or bismuth salts in aqueous or alcoholic solution to flow with a neutral, acid or slightly alkaline reaction into solutions of the alicyclic mercaptans in water or organic solvents, as for example alcohol. The metal compounds thus obtained may be further purified in known manner after separation.

The gold, silver and bismuth compounds obtainable according to this invention are distinguished, as already mentioned, by their excellent therapeutic properties. The gold compounds of the alicyclic mercaptans are considerably less poisonous than other gold preparations, whereby a valuable advance over the gold compounds of many other mercaptans is obtained.

The following examples will further illustrate how the said invention may be carried out in practice but the invention is not restricted to these examples.

Example 1

A 10 per cent aqueous or alcoholic solution of 13.5 parts of gold chloride is added to a solution of 10 parts of mercapto-cyclopentylbarbituric acid in 60 parts of alcohol. After a part of the alcohol has been removed, preferably in vacuo, water is added. The gold compound thus precipitated is freed from excess of gold salt by washing with water and dissolved by the careful addition of dilute caustic soda solution. The water-soluble sodium salt of the gold mercapto compound thus formed is precipitated by the addition of alcohol. The yield is about 80 to 85 per cent.

If under the same reaction conditions mercapto cyclopentyl acetic acid be used instead of mercapto cyclopentyl barbituric acid, a gold mercapto compound of similar properties is obtained.

Example 2

A 10 per cent aqueous solution of silver nitrate is added to a solution of 15 parts of the sodium salt of mercaptocyclopentane carboxylic acid in 100 parts of water until the precipitate formed no longer redissolves upon shaking. After the silver salt of the carbocyclic acid, which is formed in a small amount, has been removed, alcohol is added, the readily water-soluble sodium salt of the silver-mercapto compound thus being precipitated in a yield of 70 per cent.

Example 3

An alcoholic acetic acid solution of 4.5 parts of bismuth acetate is added to a 10 per cent alcoholic acetic acid solution of 10 parts of mercaptocyclopentyl-tridecanoic acid and the whole is heated for a short time while stirring. After the alcohol has been removed, the bismuth-mercapto compound formed is dissolved by the addition of caustic soda solution and, after separating the constituents which have not passed into solution, the readily water-soluble sodium salt of the bismuth-mercapto compound is separated by the addition of alcohol in a yield of 90 per cent.

Example 4

An alcoholic acetic acid solution of 12.5 parts of bismuth acetate is added to an alcoholic acetic acid solution of 10 parts of mercaptocyclopentane, whereby an amorphous yellow-colored precipitate is formed. After filtering off and drying the precipitate, it is extracted with chloroform while heating and methanol is then added to the solution of the bismuth compound of mercaptocyclopentane thus obtained. The pure bismuth compound is thus precipitated in the form of golden yellow needles in a yield of 95 per cent.

If mercaptocycloheptane be used under the same reaction conditions instead of mercaptocyclopentane, there is obtained a bismuth mercapto compound of similar properties.

What I claim is:—

1. As a new product the mercapto compound of a metal selected from the group consisting of gold, silver and bismuth in which the metal-mercapto group is attached to an alicyclic radicle.

2. As a new product the organic mercapto compound of a metal selected from the group consisting of gold, silver and bismuth in which the metal-mercapto group is attached to a cyclopentyl radicle.

3. As a new product the organic mercapto compound of a metal selected from the group consisting of gold, silver and bismuth in which the metal-mercapto group is attached to a cyclopentyl radicle containing a carboxylic acid group.

4. As a new product the organic gold-mercapto compound in which the gold-mercapto group is attached to a cyclopentyl radicle containing a carboxylic acid group.

5. As a new product the organic silver-mercapto compound in which the silver-mercapto group is attached to a cyclopentyl radicle containing a carboxylic acid group.

6. As a new product an alkali metal salt of gold mercapto-cyclopentyl acetic acid.

7. As a new product an alkali metal salt of gold mercapto-cyclopentyl barbituric acid.

8. As a new product an alkali metal salt of silver mercapto-cyclopentyl carboxylic acid.

EUGEN MUELLER.